(12) United States Patent
Filkins

(10) Patent No.: US 8,391,659 B2
(45) Date of Patent: Mar. 5, 2013

(54) METHOD OF COATING AND HANDLING MULTIPLE OPTICAL COMPONENTS SIMULTANEOUSLY

(75) Inventor: David Filkins, Warren, MA (US)

(73) Assignee: Schott Corporation, Elmsford, NY (US)

( * ) Notice: Subject to any disclaimer, the term of this patent is extended or adjusted under 35 U.S.C. 154(b) by 294 days.

(21) Appl. No.: 12/586,721

(22) Filed: Sep. 26, 2009

(65) Prior Publication Data

US 2010/0092732 A1    Apr. 15, 2010

Related U.S. Application Data

(60) Provisional application No. 61/194,781, filed on Sep. 30, 2008.

(51) Int. Cl.
*G02B 6/04* (2006.01)
(52) U.S. Cl. .......................... 385/115; 385/120
(58) Field of Classification Search .................. None
See application file for complete search history.

(56) References Cited

U.S. PATENT DOCUMENTS 4,169,001 A *   9/1979   Kaiser ..................... 156/89.12
6,361,391 B2 *  3/2002   Cathey et al. ................. 445/24

OTHER PUBLICATIONS

DeTech Detector Technology Inc. Glass Forumlation, http://www.detechinc.com/formulation.html, 3 pages, 2010.*
DeTech, Detector Technology Inc., EG-2 Etchable Core Glass for Microchannel Plate Manufacture, 1 page, Feb. 1993.*

* cited by examiner

*Primary Examiner* — Michelle R Connelly
(74) *Attorney, Agent, or Firm* — Louis J. Franco; Law Offices of Louis J. Franco

(57) ABSTRACT

A method of processing a plurality of optical components simultaneously includes providing a plate structure with first and second opposed plate faces and a plurality of the optical components retained within a sacrificial matrix material. Each optical component includes first and second component faces coinciding with, respectively, the first and second plate faces The matrix and optical-component materials are selected such that the former is soluble in a solvent in which the latter is relatively insoluble. A portion of the matrix material is dissolved is order to recess the matrix relative to at least the first component faces. With a remainder of the matrix retaining the components in their initial spatial relationships, a single, continuous substrate is adhered to a plurality of the first component faces protruding relative to the matrix. The remainder of the matrix material is then dissolved such that the substrate to which the first component faces are adhered retains the optical components.

13 Claims, 6 Drawing Sheets

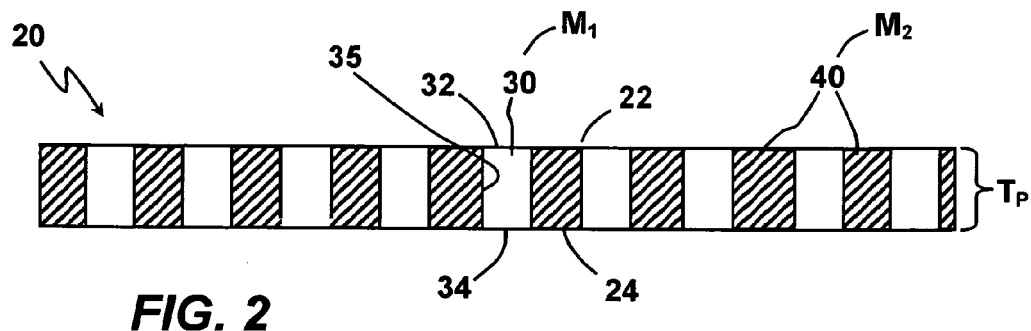
FIG. 2
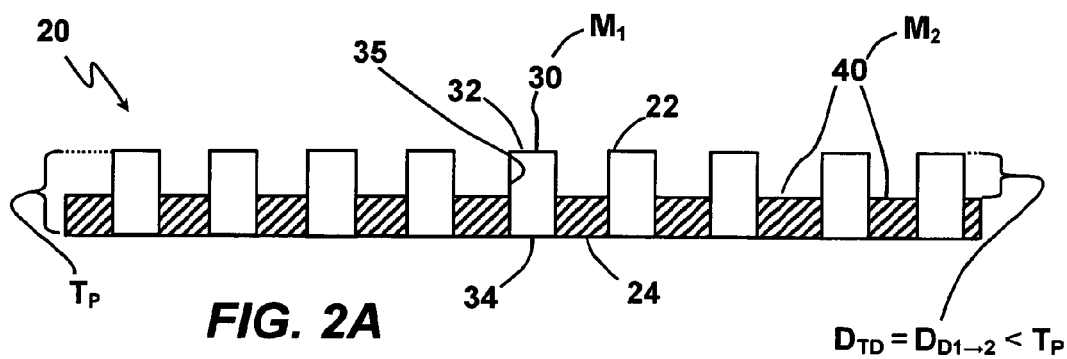
FIG. 2A
$D_{TD} = D_{D1 \to 2} < T_P$
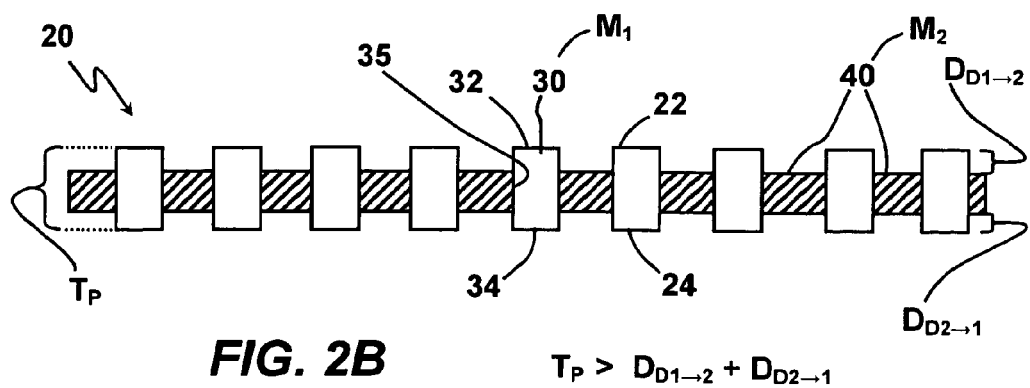
FIG. 2B  $T_P > D_{D1 \to 2} + D_{D2 \to 1}$

METHOD OF COATING AND HANDLING MULTIPLE OPTICAL COMPONENTS SIMULTANEOUSLY

PROVISIONAL PRIORITY CLAIM

Priority based on Provisional Application, Ser. No. 61/194,781 filed Sep. 30, 2008, and entitled "METHOD OF COATING AND HANDLING MULTIPLE OPTICAL RODS SIMULTANEOUSLY" is claimed. The entirety of the disclosure of the previous provisional application, including the drawings, is incorporated herein by reference as if set forth fully in the present application.

BACKGROUND

Various industries incorporate into light-transmissive—including image-transmissive—optical-assembly products small, difficult to handle optical rods, rod segments, and fused fiber bundles, which are hereinafter alternatively included within the term "optical components." Currently, during processes such as polishing and coating, for example, these optical components are processed individually, frequently by the thousands. It will be readily appreciated that individual process handling of such components contributes significantly to their cost. Moreover, production losses attributable to lost and damaged components are also incurred.

Accordingly, there exists a need for methods of processing (e.g., coating) multiple "rod-like" optical components simultaneously.

SUMMARY

Implementations of the present invention are directed to methods of simultaneously processing (i.e., fabricating, cleaning, coating and handling) multiple rod-like optical components that have heretofore been cleaned, coated and handled individually and, in various embodiments, to optical components made in accordance with the methods.

Various aspects employ techniques analogous to those applied in the fabrication of optical fiber faceplates. For instance, various implementations include the formation of a fused fiber bundle including a plurality of mutually fused optical fibers extending generally along a longitudinal axis between first and second ends. Each fiber includes a core fabricated from a first material exhibiting a first refractive index and a cladding fabricated from a second material fusedly disposed about the core and exhibiting a second refractive index, lower in magnitude than the first refractive index, such that light entering either of first and second ends of the fiber can propagate therethrough by internal reflection. In various aspects, each of the core and the cladding comprises glass. When individual fibers (i.e., monofibers) are bound, heated and drawn, the claddings of adjacent fibers become fused to one another resulting in a unitary structure (i.e., a "fused bundle") in which the cores are fusedly supported in a matrix of the second material from which the claddings of the monofibers were fabricated. The formation of such structures is generally known among fabricators of fused optical fiber components.

The fused fiber bundle is cut along, but not necessarily parallel to, a plane that extends perpendicularly to its longitudinal axis to form a plurality of fused fiber plates, each of which fused fiber plates includes first and second plate faces. In various implementations, the first and second plate faces of a fused fiber plate are ground and polished to create smooth plate faces and, if desired, a fused plate of uniform thickness or alternative profile. Each plate includes a plurality of rod-like, light-transmissive optical components (i.e., fiber segments) retained within a matrix of the aforementioned second material. Each optical component includes first and second component faces coinciding with, and forming a part of, respectively, the first and second plate faces. At least one component side extends between the first and second component faces of each optical component.

Although the terms "rod," "rod-like" and similar adjectives are used in describing the optical components, these terms are used in a very broad sense to include, for example, "rod segments." For instance, rods are commonly thought of as structures having lengths longer than their diameters or widths; the terms "rod" and "rod-like" as used in the current description, and the appended claims, include structures having widths greater than their lengths. More specifically, when plates are formed, the distance between the opposed first and second component faces of each optical component may be shorter than the diameter of that component. The terms "rod" and "rod-like" are also used broadly to refer to optical components of various cross-sectional geometries. Accordingly, to the extent the term "diameter" is associated with an optical component, it should not be assumed that the cross-sectional geometry of that component is circular. More specifically, although "diameter" is frequently thought of narrowly as the longest chord that can be fitted within the curve defining a circle, the more general definition of that term is applicable to this description and the appended claims. For instance, chords within squares, rectangles, hexagons, and even, irregular shapes are also diameters. A radius is a line segment extending from the geometric center of a shape to the boundary of the shape or one half the length of specified diameter. Nothing in the preceding explanation should be construed to attribute to the terms "diameter" and "radius" a meaning more narrow than common usage and a more generalized mathematical usage would attribute to them.

While process steps subsequently described are in actuality performed on multiple plates simultaneously or successively, subsequent steps are explained relative to a single plate structure of the general configuration described above, irrespective of whether the plate structure under consideration resulted from a process such as that described above. The first and second materials from which the optical components and the matrix are formed are selected such that the matrix is soluble in a predetermined matrix solvent in which the optical components are relatively insoluble. At least the first plate face is exposed to the matrix solvent in order to dissolve the matrix material to a total depth that is less than the plate thickness such that a remainder of matrix material retains the components, but is recessed relative to at least the first component faces. More specifically, in one implementation, only the first plate face is initially exposed to the matrix solvent in order to dissolve the matrix material from the first plate face toward, but not all the way to, the second plate face. In a second, alternative implementation, both the first and second plate faces are exposed to the matrix solvent in order to partially dissolve the matrix material, leaving a remainder of matrix material that is recessed relative to both the first component faces and the second component faces. In either event, the total depth of dissolution, whether from only the first plate face or from both plate faces, is initially less than the total plate thickness such that a remainder of matrix material retains the components in fixed relative positions.

Following the initial dissolution, or "etching," step described above, the plate is typically cleaned and dried. Irrespective of whether, in any particular implementation, the plate is cleaned and dried after initial etching, a quantity of a predetermined optical coating is applied to at least the first component faces. In processes calling for the production of optical components in which only the first component faces are coated, it will be appreciated that either initial etching process described above may be employed. That is, coating may be equally-well effectuated whether the matrix material is initially etched from both plate faces or from just the first plate face. However, it will also be appreciated that, in a version in which both the first and second component faces are to be coated with a predetermined optical coating, the matrix material is etched below both the first and second component faces.

With the optical coating applied to at least the first component faces, the remainder of the matrix material is dissolved by exposure to the matrix solvent, thereby freeing the individual optical components from retention by the matrix material. In various instances, however, it may be desirable to retain the optical components in the same relative positions in which they were retained by the matrix material. Accordingly, in some versions, before the remainder of the matrix material is dissolved, an adhesive substrate is adhered by adhesive to either of the first and second component faces prior to final matrix dissolution. In alternative versions, the adhesive substrate is variously configured and may be, for example, a relatively rigid card or board-like material or a more flexible material such as a tape. However, the substrate of various versions is generally a single-continuous structure that can be adhered to plural component faces simultaneous. The nature of the adhesive may also vary and may be, for example, a pressure-sensitive adhesive and/or a thermally released adhesive, by way of non-limiting example. With the adhesive substrate applied to one side (plate face) of the plate or "wafer," the remainder of matrix material can be dissolved from the opposite side. With the matrix remainder dissolved, and the adhesive substrate in place, the optical components are retained in an orderly arrangement for subsequent handling, including, where applicable, packaging and shipping to customers.

In some cases, only the first component faces are to be coated with the predetermined optical coating. Moreover, there are instances in which the matrix solvent is incompatible with (i.e., will damage) the applied coating. In such instances, the adhesive substrate is applied to the coated first component faces and dissolution of the matrix remainder is performed from the second plate face. In alternative implementations, the substrate also serves to mask the coated first component faces from contact with the matrix solvent. It will be readily appreciated that the designation of first and second plate and component faces is arbitrary. Accordingly, for example, when only one set of component faces is to be coated, that set of faces is by definition "the first component faces," and the plate side coinciding therewith is the first plate face.

Depending on the nature of the first and second materials from which the matrix material optical components are fabricated, the matrix solvent may be an acidic or basic solution. In various implementations, the first material from which the optical components are fabricated is a first glass and the second material form which the matrix material is fabricated is a second glass.

In still additional versions, the optical components are internally-reflecting clad-rod components. More specifically, in some versions, each optical component includes an optically-transmissive core fabricated from a first material exhibiting a first refractive index and a cladding fabricated from a second material fusedly disposed about the core and exhibiting a second refractive index. The second refractive index is lower in magnitude than the first refractive index, such that light entering either of the first and second component faces can propagate by internal reflection between the opposed faces. In an illustrative implementation in which the optical components are internally-reflecting rods, the first material from which the core is fabricated is a first glass and the second material from which the cladding of each component is fabricated is a second glass. The matrix material is fabricated from a third glass material that, prior to dissolution, fusedly retains the optical components.

It is to be understood that, throughout the specification and claims, the identification of the core, cladding and matrix as first, second, and third materials or glasses is entirely arbitrary and merely intended to indicate, in such instances in which the core, cladding and/or matrix material are so identified, that they are made from distinct materials with differing optical, physical or chemical properties. Accordingly, for example, in a case in which a plurality of cores is supported in a matrix, the cores might be identified as fabricated from a first material (e.g., a first glass) whereas the matrix might be identified as being fabricated from a second material (e.g. a second glass). However, as in the preceding paragraph, in instances in which the optical components are internally-reflecting clad-rod components, the cores, the claddings around the cores, and the matrix in which the optical components are retained in fixed positions might be identified as being fabricated from, respectively, first, second and third materials.

Representative implementations are more completely described and depicted in the following detailed description and the accompanying drawings.

BRIEF DESCRIPTION OF THE DRAWINGS

FIG. 2 is an edgewise depiction of a plate including parallel first and second opposed plate faces and a plurality of rod-like, light-transmissive optical components retained within a matrix material and including first and second component faces coinciding with, and at least partially defining, respectively, the first and second plate faces;

FIG. 2A shows a plate such as that of FIG. 2 in which a portion of the matrix material, beginning at the first plate face, has been dissolved in a matrix solvent such that portions of the lengths of the optical components, beginning at the first component faces, protrude from the matrix material;

FIG. 2B is an edgewise view of a plate such as the plate of FIG. 2 in which portions of the matrix material, beginning at both the first and second plate faces, have been chemically etched by a matrix solvent that portions of the lengths of the optical components, beginning at both the first and second component faces, protrude from the matrix material;

DETAILED DESCRIPTION

The following description of methods of coating and handling multiple optical components simultaneous, and of optical components coated in accordance therewith, is demonstrative in nature and is not intended to limit the invention or its application of uses. The various implementations, aspects, versions and embodiments described in the summary and detailed description are in the nature of non-limiting examples falling within the scope of the appended claims and do not serve to define the maximum scope of the claims.

Figure 1:
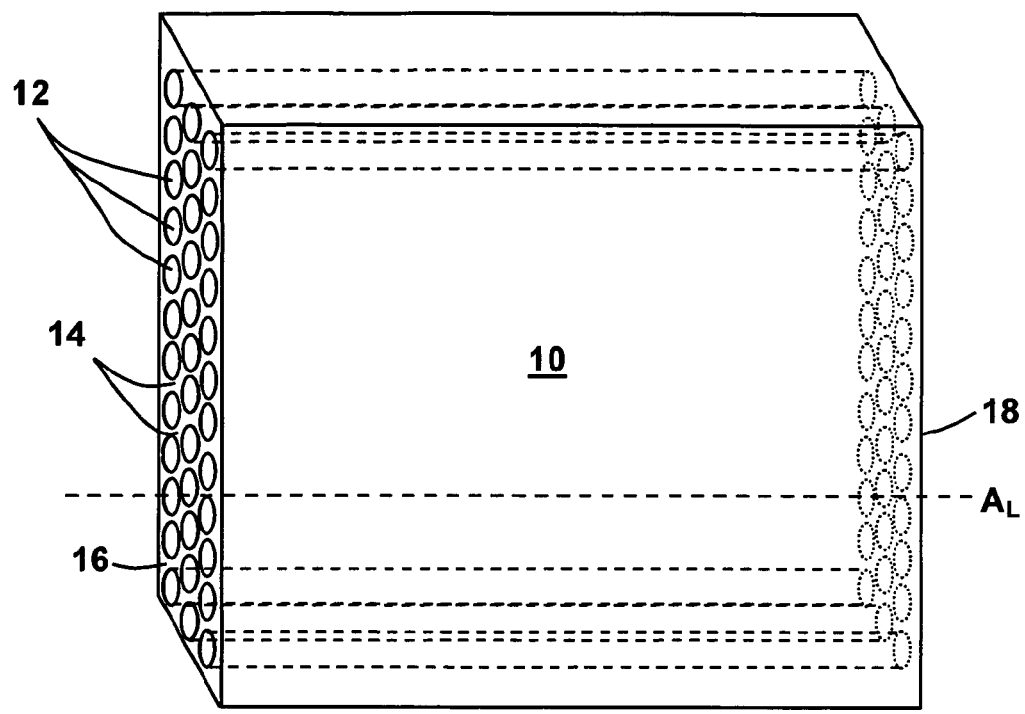
FIG. 1 depicts a fused fiber bundle including a plurality of cores surrounded, and retained in position, by fused cladding material.
Figure 1A:
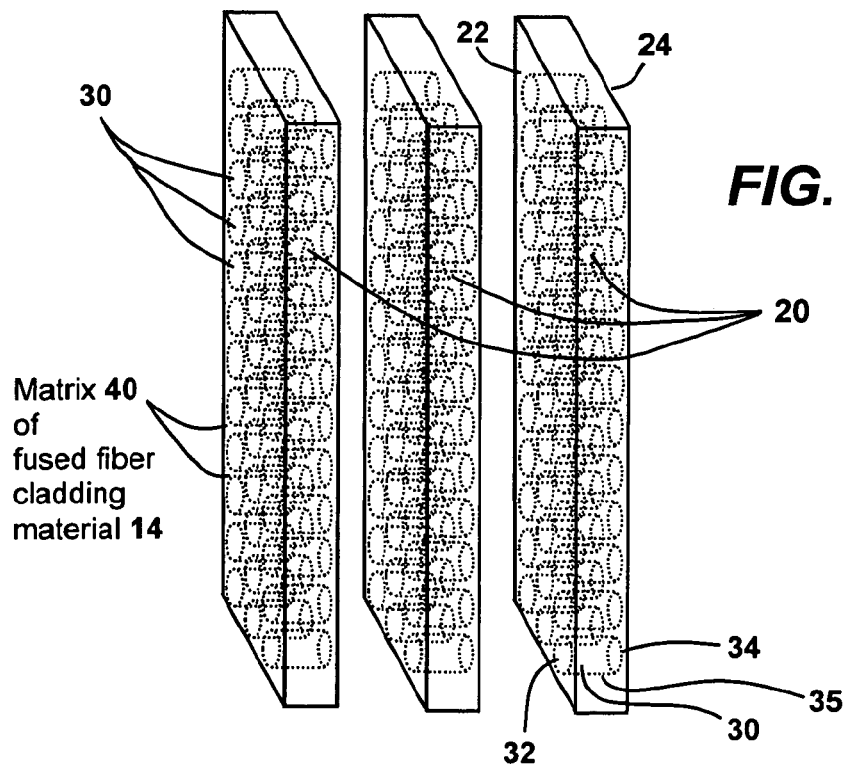
FIG. 1A shows fused fiber plates cut from the fused fiber bundle of FIG. 1.

Referring to FIGS. 1 and 1A, various implementations include one of (i) fabricating and (ii) providing a fused fiber bundle 10 including a plurality of cores 12 extending through fused cladding material 14 along a longitudinal axis $A_L$ between first and second ends 16 and 18 of the fiber bundle 10. As is generally known by those of ordinary skill in the art of optical-fiber component fabrication, a fused bundle such as the illustrative bundle 10 of FIG. 1 is formed by adjacently binding, and then heating and drawing, a plurality of constituent "monofibers," each of which monofibers includes a core about which is fusedly collapsed a cladding tube. When the bound assembly of monofibers is heated and drawn, each cladding tube fuses to the cladding tubes of adjacent monofibers, resulting in a unitary structure (i.e., a fused bundle 10) including a plurality of cores 12 fusedly retained within fused cladding material 14.

Referring to FIG. 1A, fused fiber plates 20 (or "plate structures") are formed by cutting the fused bundle 10 perpendicularly to the longitudinal axis $A_L$ thereof. Each plate 20 has opposed first and second plate faces 22 and 24. In a typical implementation, the first and second plate faces 22 and 24 are ground and polished to create smooth, planar faces. However, cutting, grinding and polishing to create other-than-planar faces and plate profiles that are of other-than-uniform thickness is within the scope and contemplation of the invention. Each plate 20 includes a plurality of rod-like, light-transmissive optical components 30 (i.e., segments of cores 12) retained within a matrix 40 of the aforementioned cladding material 14. Each optical component 30 includes first and second component faces 32 and 34 coinciding with, and forming a part of, respectively, the first and second plate faces 22 and 24. At least one component side 35 extends between the first and second component faces 32 and 34 to of each optical component 30.

Depicted in FIG. 2 is edgewise view of a plate 20 including parallel first and second plate faces 22 and 24 defining a predetermined plate thickness $T_P$. The optical components 30 and the matrix 40 are fabricated from disparate first and second materials $M_1$ and $M_2$ selected such that the matrix 40 is soluble in a predetermined matrix solvent (not shown) in which the optical components 30 are relatively insoluble.

Referring to FIGS. 2A and 2B, at least the first plate face 22 is exposed to the matrix solvent in order to dissolve the matrix 40 (material $M_2$) to a total dissolution depth $D_{TD}$ that is less than the plate thickness $T_P$ such that a remainder (undissolved portion) of the matrix 40 retains the optical components 30. FIG. 2A illustrates the result of initially exposing only a portion of the plate thickness $T_P$ beginning at the first plate face 22 to the matrix solvent, while FIG. 2B depicts the result of exposing to the matrix solvent portions of the plate thickness $T_P$ beginning at both of plate faces 22 and 24. In FIG. 2A, the matrix 40 is dissolved to a first dissolution depth $D_{D1 \to 2}$ extending from the first plate face 22 toward the second plate face 24 such that the matrix 40 is recessed relative to the first component faces 32, which faces 32 are, after dissolution, all that remain of first plate face 22. As indicated in FIG. 2A, the first dissolution depth $D_{D1 \to 2}$ is equal to the total dissolution depth $D_{TD}$. In FIG. 2B, the matrix 40 has been dissolved from the first plate face 22 to a first dissolution depth $D_{D1 \to 2}$ extending from the first plate face 22 toward the second plate face 24 and to a second dissolution depth $D_{D2 \to 1}$ extending from the second plate face 24 toward the first plate face 22 such that the matrix 40 is recessed relative to both the first component faces 32 and the second component faces 34. In either of the cases shown in FIGS. 2A and 2B, the total dissolution depth $D_{TD}$ is less than the total plate thickness $T_P$ such that a remainder of matrix material $M_2$ retains the optical components 30 in fixed relative positions.

Figure 3A:
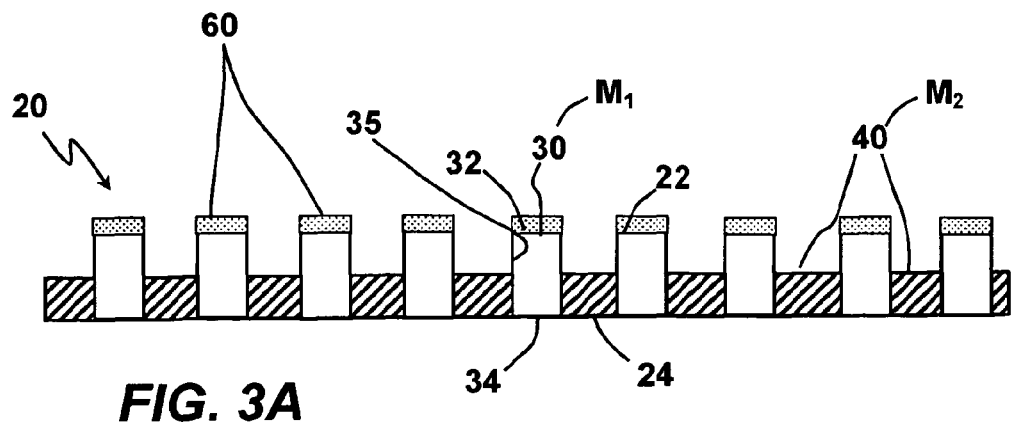
FIG. 3A depicts the etched plate of FIG. 3A in which the first component faces of the optical components have been coated with a predetermined optical coating.
Figure 3B:
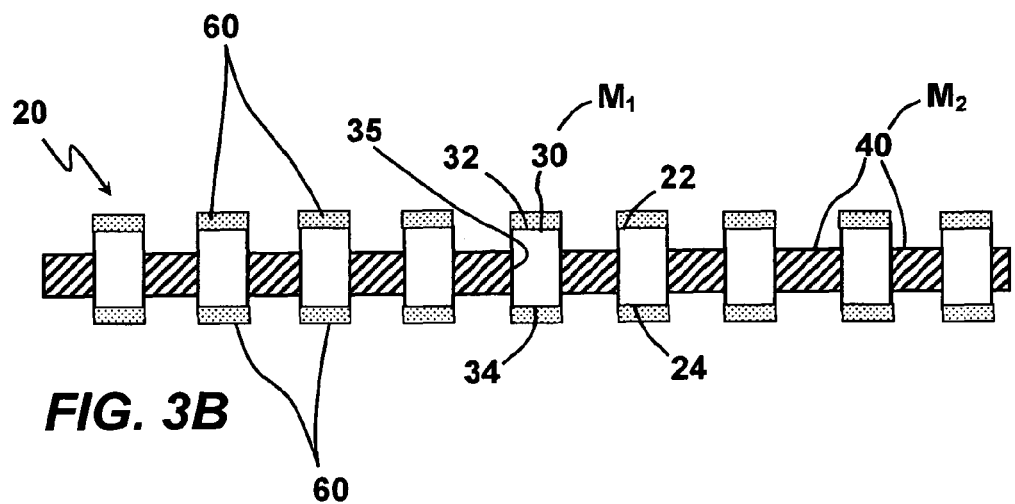
FIG. 3B depicts the etched plate of FIG. 3B in which the first and second component faces of the optical components have been coated with a predetermined optical coating.

With reference to FIG. 3A, a predetermined optical coating 60 is applied to the protruding first component faces 32 of the plate 20 depicted in FIG. 2A, while, in FIG. 3B, optical coating 60 has been applied to both the protruding first and second component faces 32 and 34. The nature of the optical coating 60 and method(s) of application may vary. The coating 60 may be applied through (i) spraying, (ii) partial immersion in a bath of coating, (iii) chemical vapor deposition (CVD) or (iv) physical vapor deposition (PVD), by way of non-limiting example. The coating 60 may be applied for various purposes, including, for example, (i) to add anti-glare, (ii) to provide mechanical protection, (iii) to impart wavelength responsive scintillation properties and/or (iv) to impart wavelength filtration characteristics to the optical components 30.

Figure 4A:
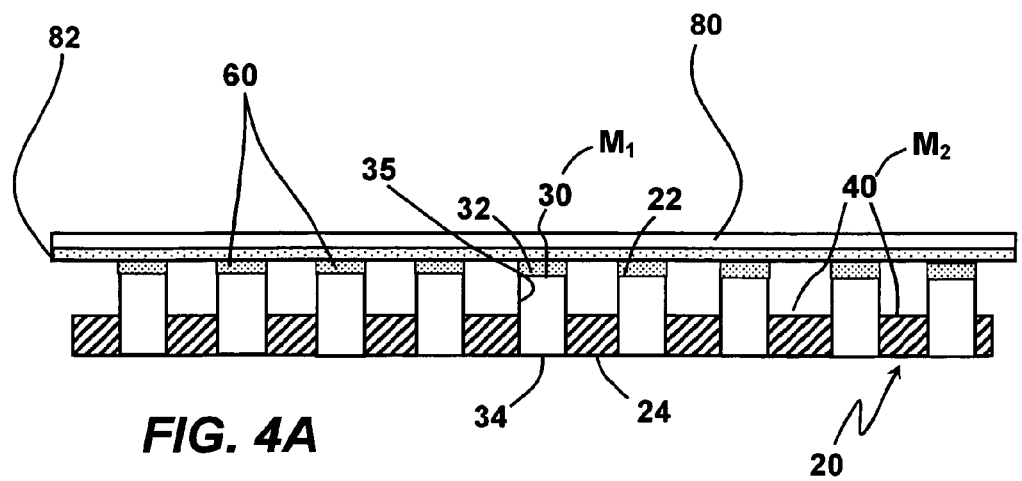
FIGS. 4A and 4B show optical-component assemblies comprising the plates of, respectively, FIGS. 3A and 3B after application of adhesive substrates.
Figure 4B:
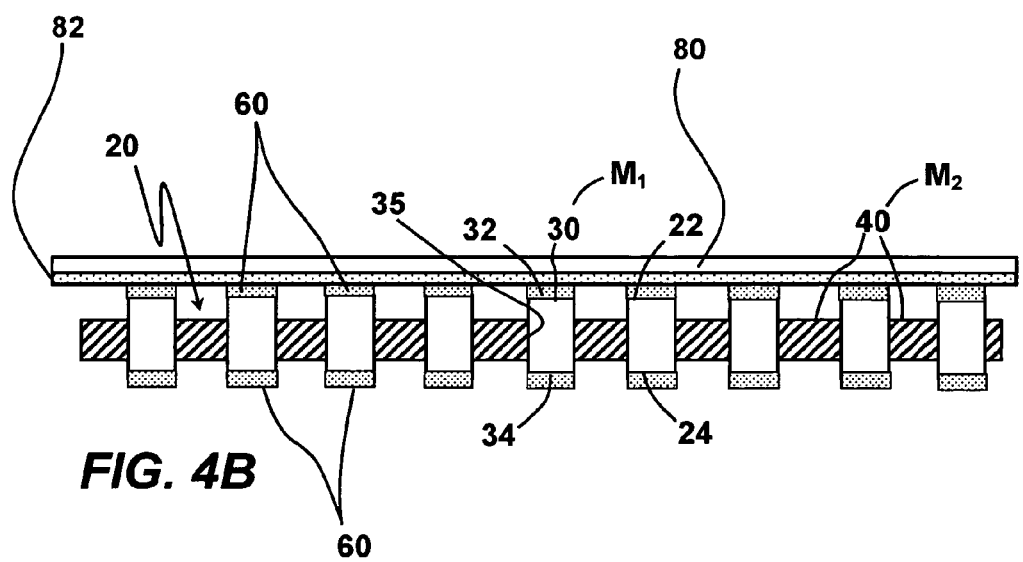
Figure 5A:
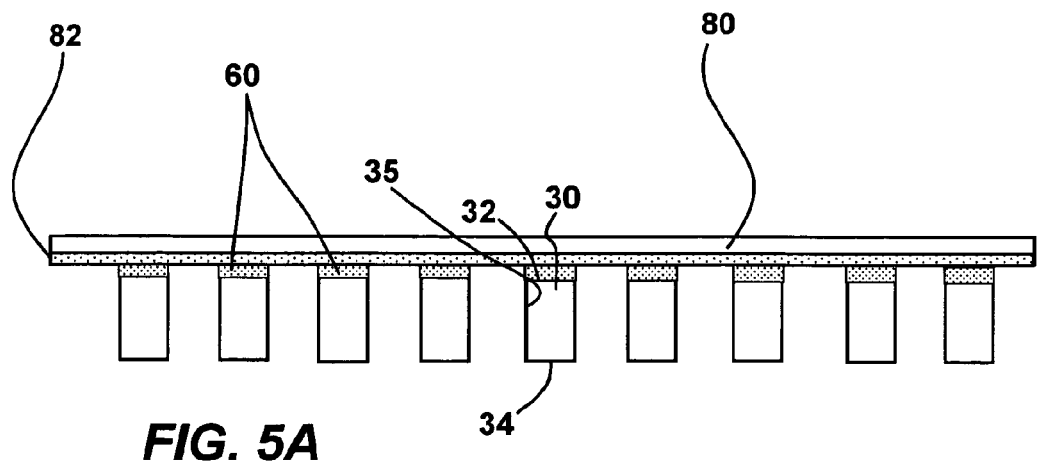
FIGS. 5A and 5B depict the optical components of, respectively, FIGS. 4A and 4B after final dissolution of the matrix material.
Figure 5B:
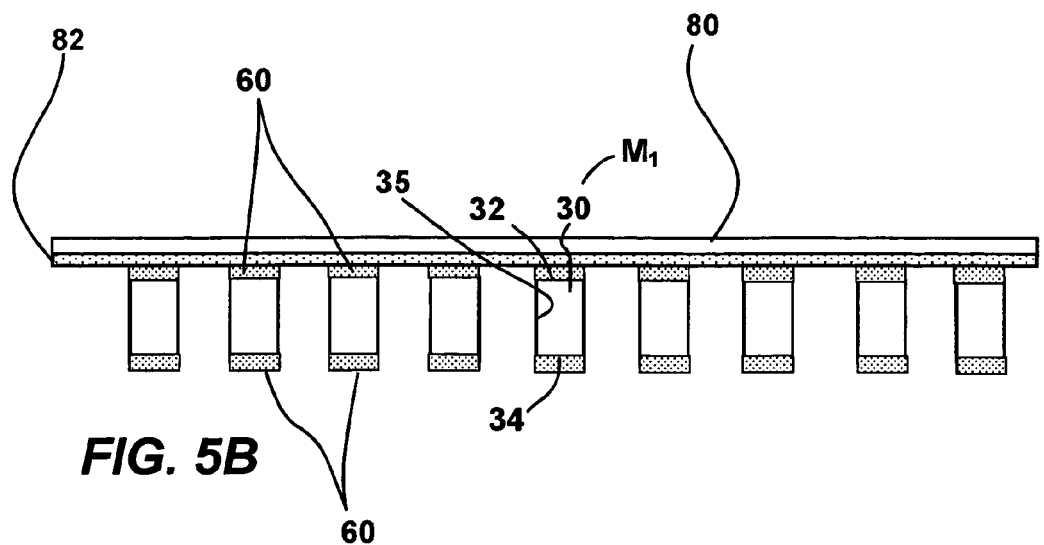

As explained in the summary, once at least the first component faces 32 are coated with coating material 60, the remainder of the matrix material $M_2$ is dissolved in order to free the individual optical components 30 from retention by the matrix 40. Further explained in the summary was the desire, in some cases, of retaining the optical components 30, after final dissolution of the matrix 40, in the same relative positions that they occupied when retained by the matrix 40. Accordingly, with reference to FIGS. 4A and 4B, various implementations include applying an adhesive substrate 80 with an adhesive 82 to one of the first and second component faces 32 and 34 prior to dissolving the remainder of the matrix 40. In versions associated with each of FIGS. 4A and 4B, in which the plates 20 of, respectively, FIGS. 3A and 3B are depicted, the adhesive substrate 80 is a rigid, card-like structure, although alternatives such as flexible, adhesive strips (e.g., tapes) may be used in different implementations. With the adhesive substrate 80 applied to one side (plate face 22 or 24) of the plate 20, the remainder of matrix 40 is dissolved from the side opposite to which the adhesive substrate 80 is applied. FIGS. 5A and 5B show the optical components 30 of, respectively, FIGS. 4A and 4B after final dissolution of the matrix 40. With the remainder of the matrix 40 dissolved, and the adhesive substrate 80 in place, the optical components 30 are retained in the same relative spatial arrangement in which they were retained by the matrix 40.

Figure 6:
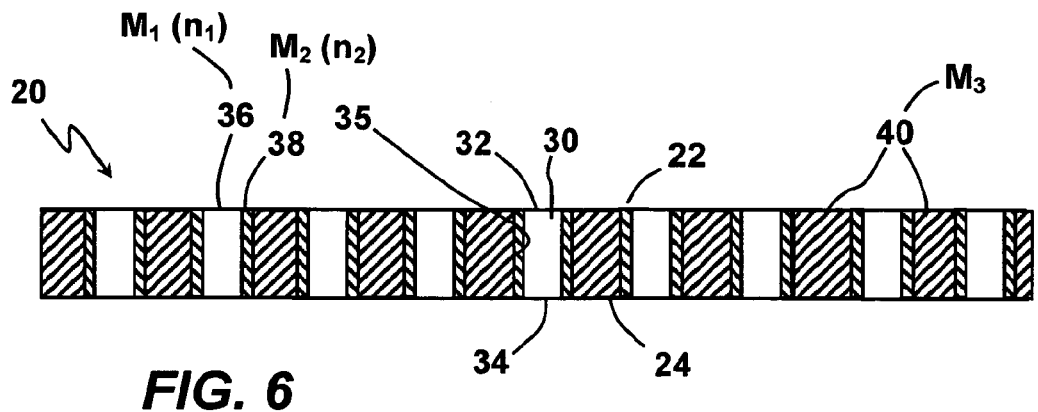
FIGS. 6 through 6B show fiber plates in which the optical components are internally-reflecting clad-rod components.
Figure 6A:
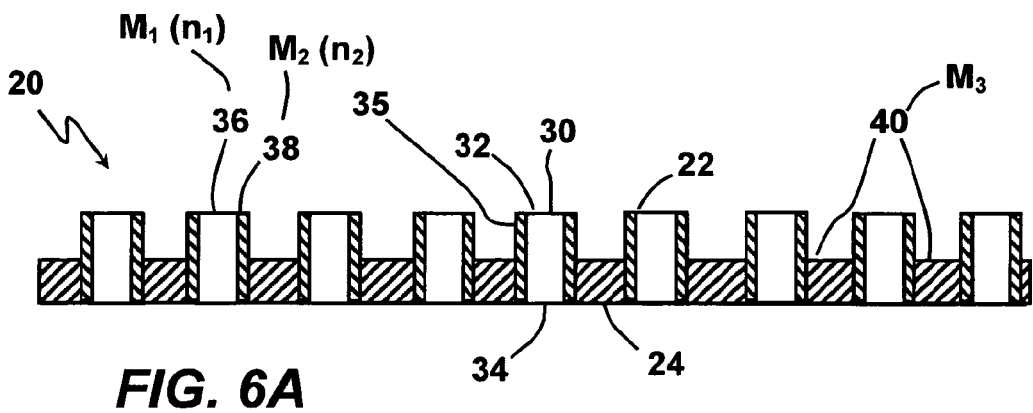
Figure 6B:
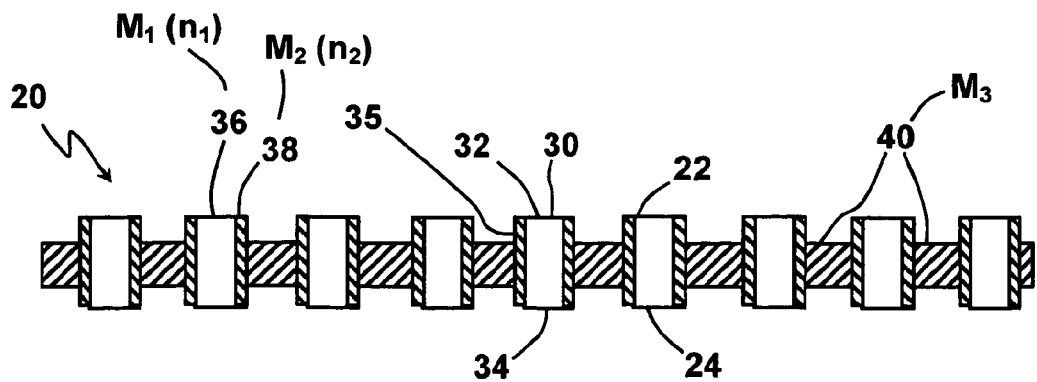

Although the preceding description is generally demonstrative of the principles of the invention, it was noted in the summary that the optical components of various more particular versions within the scope of the versions previously described are internally-reflecting clad-rod components. Illustratively depicted in each of FIGS. 6 through 6B is a fused fiber plate 20 in which, like the plates 20 previously depicted and described, includes a plurality of rod-like, light-transmissive optical components 30. The plates 20 of FIGS. 6, 6A and 6B are in stages of processing analogous to the processing stages depicted in, respectively, FIGS. 2, 2A, and 2B. However, each of the optical components 30 of FIGS. 6 through 6B includes an optically-transmissive core 36 and a cladding 38 fusedly disposed about the core 36. With continued reference to FIGS. 6 through 6B, the core 36 of each optical component 30 is fabricated from a first material $M_1$ having a first refractive index $n_1$, while the cladding 38 is fabricated from a second material $M_2$ having a second refractive index $n_2$, lower in magnitude than the first refractive index $n_1$, such that light entering either of the first and second component faces 32 and 34 can propagate by internal reflection between the opposed component faces 32 and 34. As with versions previously discussed, the matrix 40 fusedly retains the optical components 30 in fixed relative positions. In the versions of FIGS. 6 through 6B, however, the matrix 40 is indicated as being fabricated from a third material $M_3$. The third material $M_3$, which may be a glass, is soluble in a predetermined matrix solvent (not shown) in which both the first and second materials $M_1$ and $M_2$ of the optical components 30 are relatively insoluble. In other major respects, the processes by which the clad optical components 30 of FIGS. 6 through 6B are analogous to the processes previously described in conjunction with FIGS. 2 through 5B and, therefore, further description of the processes relative to the versions of FIGS. 6 through 6B is unwarranted.

The foregoing is considered to be illustrative of the principles of the invention. Furthermore, since modifications and changes to various aspects and implementations will occur to those skilled in the art, it is to be understood that the foregoing does not limit the invention as expressed in the appended claims to the exact constructions, implementations and operations shown and described. It is also to be understood that any sequence of steps presented or implied in the drawings, and discussed above, is illustrative only and not necessarily indicative of the order in which the steps must be performed. Accordingly, nothing in the drawings, the description or the corresponding claims should be construed so as to limit the scope of the invention to a particular sequence of steps unless a particular order is inextricably dictated by context. Moreover, methods within the scope of the claims may include fewer than all steps discussed in the description. Accordingly, all suitable modifications and equivalents may be resorted to that appropriately fall within the scope of the invention as expressed in the appended claims.

What is claimed is:

1. A method of processing a plurality of light-transmissive optical components simultaneously, the method comprising:
    providing a plate structure including first and second opposed plate faces and a plurality of light-transmissive optical components fusedly retained within a matrix material, wherein (i) the matrix material is soluble in a matrix solvent in which the optical components are relatively insoluble and (ii) each optical component includes first and second component faces coinciding with, respectively, the first and second plate faces;
    dissolving the matrix material from the first plate face toward the second plate face such that a remainder of matrix material that is recessed relative to at least the first component faces retains the components in fixed relative positions; and
    adhering a single, continuous substrate to a plurality of the first component faces; wherein
        (i) each optical component comprises a core fabricated from a first material exhibiting a first refractive index and a cladding fabricated from a second material fusedly disposed about the core and exhibiting a second refractive index, lower in magnitude than the first refractive index, such that light entering either of the first and second component faces can propagate by internal reflection between the opposed faces;
        (ii) the core of each component is fabricated from a first glass;
        (iii) the cladding of each component is fabricated from a second glass; and
        (iv) the matrix material is fabricated from a third glass that is different from the second glass.

2. The method of claim 1 further comprising the step of dissolving the remainder of the matrix material such that the substrate to which the first component faces are adhered retains the optical components.

3. The method of claim 2 further comprising the step of applying an optical coating to the first component faces prior to adhering the substrate to the first component faces.

4. A method of applying an optical coating to a plurality of light-transmissive optical components simultaneously, the method comprising:
    providing a plate of predetermined plate thickness including parallel first and second opposed plate faces and a plurality of rod-like, light-transmissive optical components retained within a matrix material, wherein (i) the matrix material is soluble in a predetermined matrix solvent in which the optical components are relatively insoluble and (ii) each optical component includes first and second component faces coinciding with, respectively, the first and second plate faces and at least one component side extending between the first and second component faces;
    exposing at least the first plate face to the matrix solvent in order to dissolve the matrix material to a total dissolution depth that is less than the plate thickness such that a remainder of matrix material retains the components, but is recessed relative to at least the first component faces;
    applying a quantity of the optical coating to the first component faces; and
    exposing the remainder of matrix material to the matrix solvent in order to dissolve the remainder of the matrix material; wherein
        (i) each optical component comprises a core and a cladding disposed about the core;
        (ii) the core of each component is fabricated from a first material;
        (iii) the cladding of each component is fabricated from a second material different from the first material; and
        (iv) the matrix material is fabricated from a third material different from the second material.

5. The method of claim 4 further comprising the step of applying an adhesive substrate to the coated first component faces prior to dissolving the remainder of the matrix material such that, when the matrix material is dissolved, the adhesive substrate retains the components in the same relative positions in which they were retained by the matrix material.

6. The method of claim 5 wherein the core of each component is fabricated from a first material exhibiting a first refractive index and the cladding of each component is fabricated from a second material fusedly disposed about the core and exhibiting a second refractive index, lower in magnitude than the first refractive index, such that light entering either of the first and second component faces can propagate by internal reflection between the opposed faces.

7. The method of claim 6 wherein
(i) the core of each component is fabricated from a first glass;
(ii) the cladding of each component is fabricated from a second glass;
(ii) the matrix material is fabricated from a third glass; and
(iii) prior to dissolution, the components are fusedly retained by the matrix material.

8. An optical-component assembly comprising:
a plate structure including opposed first and second plate faces and a matrix material retaining in fixed relative positions a plurality of light-transmissive optical components, each optical component having first and second component faces; wherein
  (i) the first and second component faces at least partially define, respectively, the first and second plate faces;
  (ii) the matrix material is recessed relative to at least one of (a) the first component faces and (b) the second component faces, such that at least one of the first component faces and the second component faces protrude from the matrix material;
  (iii) the matrix material is soluble in a predetermined matrix solvent in which the optical components are relatively insoluble; and
  (iv) each optical component comprises a core fabricated from a first material exhibiting a first refractive index and a cladding fabricated from a second material fusedly disposed about the core and exhibiting a second refractive index, lower in magnitude than the first refractive index, such that light entering either of the first and second component faces can propagate by internal reflection between the opposed faces.

9. The optical-component assembly of claim 8 wherein
(i) of the first and second component faces, only the first component faces protrude from the matrix material; and
(ii) the first component faces are coated with an optical coating.

10. The optical-component assembly of claim 9 further comprising a substrate adhered by adhesive to one of (i) the first component faces and (ii) the second component faces such that, when the matrix material is dissolved, the optical components are retained in the same relative spatial arrangement in which they were retained by the matrix material.

11. The optical-component assembly of claim 8 further comprising a substrate adhered by adhesive to one of (i) the first component faces and (ii) the second component faces such that, when the matrix material is dissolved, the optical components are retained in the same relative spatial arrangement in which they were retained by the matrix material.

12. The optical-component assembly of claim 8 wherein
(i) both the first and second component faces protrude from the matrix material; and
(ii) at least one of the first component faces and the second component faces are coated with an optical coating.

13. The optical-component assembly of claim 12 further comprising a substrate adhered by adhesive to one of (i) the first component faces and (ii) the second component faces such that, when the matrix material is dissolved, the optical components are retained in the same relative spatial arrangement in which they were retained by the matrix material.

* * * * *